June 17, 1969  R. W. FERRARI  3,450,276

WAREHOUSE SYSTEM WITH INCLINED STORAGE RACKS

Filed Sept. 20, 1966

INVENTOR
ROY W. FERRARI

INVENTOR
ROY W. FERRARI
BY
Baldwin, Doran & Egan
ATTORNEYS

United States Patent Office 3,450,276
Patented June 17, 1969

3,450,276
WAREHOUSE SYSTEM WITH INCLINED STORAGE RACKS
Roy W. Ferrari, Mayfield Heights, Ohio, assignor to The Triax Company, Cleveland, Ohio, a corporation of Ohio
Filed Sept. 20, 1966, Ser. No. 580,684
Int. Cl. B65g 1/16, 7/00, 7/12
U.S. Cl. 214—16.4    4 Claims

ABSTRACT OF THE DISCLOSURE

A warehousing system comprising laterally spaced storage sections defining travel zones extending along the sides of the storage sections, and a load carrier movable in the travel zone for depositing loads into and removing loads from the storage sections. The storage sections are of framework construction defining storage bins, and including load support rails extending generally transverse to the direction of lengthwise extension of the travel zones and providing upwardly facing load support surfaces for supporting loads thereon in bridging relation across pairs of the support rails. The support surfaces slope downwardly in a direction away from the respective travel zone for resisting inadvertent movement of loads supported on the support surfaces in a direction toward the respective travel zone. In one embodiment, the storage section comprises storage bins disposed in juxtaposed end-to-end relation with the load receiving end of each bin facing a respective travel zone, and with the load support rails for the end-to-end bins defining a generally V-shaped configuration in side elevation.

---

This invention relates in general to warehousing systems for storing or unstoring loads by transferring them between a movable load carrier and a storage frame and more particularly relates to the construction of the storage frame so as to prevent inadvertent movement of loads stored therein during operation of the load carrier.

The general type of warehousing system to which the present invention may be applied is disclosed in assignee's U.S. Patent 3,139,994, issued July 7, 1964, in the name of Anthony R. Chasar, and entitled, Mechanical Load Handling, Transfer and Storage Equipment.

The above referred to warehousing system of Patent 3,139,994 comprises a storage frame having vertically and horizontally arranged load support means or bins, opening at vertical work faces disposed on either side of an intermediate aisle or travel zone. An automatically controlled, mechanized load carrier is movable along the aisle or travel zone and has an elevator for transporting a load to different levels in the storage frame. Since the storage frame and the means for guiding the load carrier in its horizontal movement in the travel zone, are tied together by structural elements, any vibration due to movement of the load carrier is transmitted directly to the storage frame. Experience has illustrated that considerable vibration occurs during movement of the load carrier in the travel zone especially during its starting and stopping movements with respect to the storage frame, to either deposit a load therein or to remove a load therefrom.

The present invention provides a novel construction of storage frame, for insuring that loads supported on or stored in the storage frame will not be inadvertently moved due to the vibration in the system, outwardly toward the aisle or travel zone, but will remain in the position in which the load or loads were originally deposited in the storage frame by the load carrier.

In applicant's arrangement shown, this is accomplished by providing a slope for the load supporting members in the storage frame, so that the load supporting surfaces are sloped upwardly in the direction of movement of the load or loads due to vibration, so that the weight of the stored load or loads tends to urge the loads in the opposite direction, or in other words in a direction inwardly of the storage bins.

Accordingly, it is an object of the present invention to provide a novel warehousing system.

Another object of the invention is to provide a novel warehousing system which includes a storage frame, having a travel zone alongside thereof in which a powered load carrier is movable for inserting loads into or removing loads from the storage frame, and wherein means is provided in the storage frame for preventing inadvertent movement of the loads in the storage frame out of the storage frame due to vibrations in the storage frame.

Another object of the invention is to provide a novel warehousing system which includes a storage frame for storing loads and having a travel zone alongside said frame and a powered load carrier movable in the travel zone for depositing loads into or removing loads from the storage frame, and wherein the storage frame includes load supporting rails which are sloped downwardly in a direction away from the open load receiving ends of the rails.

A further object of the invention is to provide in a warehousing system of the above described type, a plurality of storage frame sections disposed in abutting side-by-side relation, and wherein the storage bins in each of the storage frame sections are sloped in a direction downwardly toward the juxtaposed sides of the storage bins.

A still further object of the invention is to provide a novel storage frame construction for use in an automatic warehousing system wherein the storage frame is formed of spaced posts having load carrying members extending therebetween for supporting a load thereon and with a travel zone for the load carrier alongside the storage frame, and wherein the load carrying members are oriented in upwardly sloped relationship so that the loads do not tend to move relative to the load supporting members toward the travel zone in the event vibration of the storage frame.

A still further object of the invention is to provide a storage frame construction for use in an automatic warehousing system wherein the frame comprises a plurality of vertical posts supporting load carrying members thereon in bridging relationship and defining load receiving bins, and wherein stop means is provided at one end of the load carrying members for stopping the movement of the load into the storage bin defined by the respective load carrying members, and wherein the load carrying members defining each bin are tipped so as to slope upwardly in a direction toward the loading end of the bin, so that a load deposited therein will not tend to move out of the bin in the event vibration applied to the storage frame.

Other objects and advantages of the invention will be apparent from the following description taken in conjunction with the accompanying drawings wherein.

Figure 1:
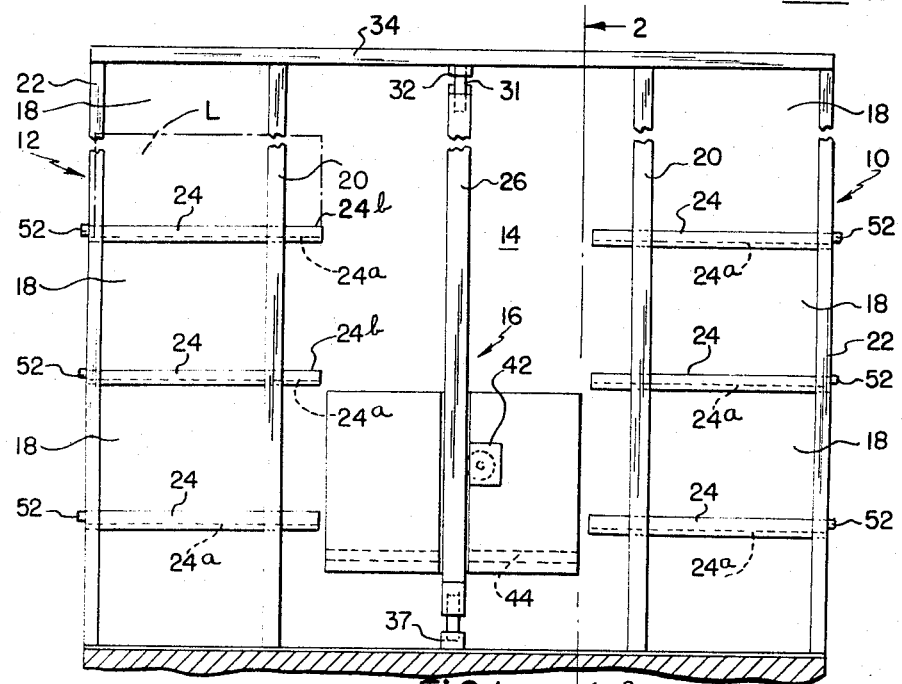
FIGURE 1 is a diagrammatic, end elevational view of a warehousing system embodying the instant invention.
Figure 2:
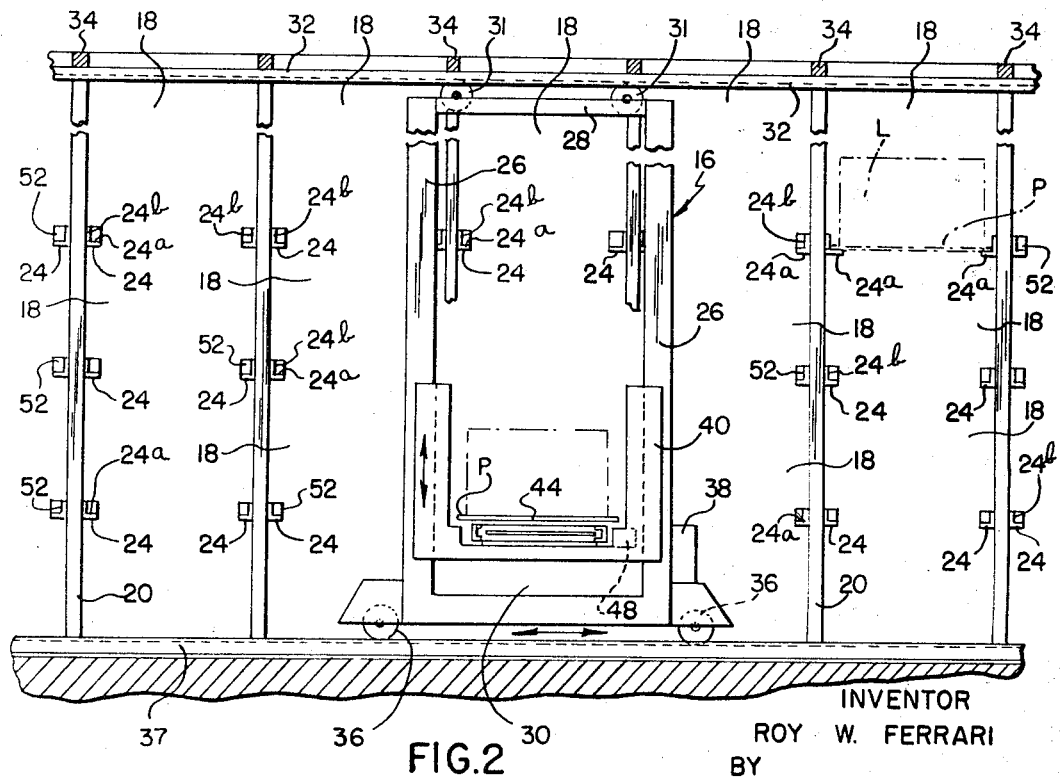
FIGURE 2 is a fragmentary generally diagrammatic sectional view of the warehousing system of FIGURE 1 taken generally along the plane of line 2—2 thereof.

Referring now again to the drawings and in particular to FIGURES 1 and 2 thereof, the warehousing system in the embodiment illustrated is of the automatic type and may comprise generally parallel storage bay sections 10 and 12 defining between them an aisle or travel zone 14 so as to permit the motorized load carrier 16 to be moved along the travel zone to insert or withdraw loads from the load supporting storage bins 18 formed by the respective storage frame sections.

Each storage frame section may be constructed of a plurality of vertically extending laterally spaced posts 20, 22 spaced apart by a plurality of generally horizontally extending load supporting members or rails 24 defining the aforementioned storage bins. The load supporting members 24 are adapted to receive loads L thereon in bridging relationship (as shown for instance in FIGURE 2) for storing the loads in the storage frame.

Disposed at one end of each of the storage frame sections there may be provided a pickup and discharge station (not shown) which is adapted for receiving the loads handled by the load carrier 16. Reference may be had to assignee's copending U.S. patent application, Ser. No. 484,845, filed Sept. 3, 1965, now Patent No. 3,371,804 in the name of Anthony R. Chasar and entitled Automatic Warehousing System for a detailed disclosure of a suitable construction of pickup and discharge station.

As best shown in FIGURE 2, the bins 18 are open throughout their vertical height and the load supporting rails 24 may comprise L or angle shaped members (in transverse cross section) providing a laterally extending load supporting portion 24a and a generally vertically extending load aligning and guiding portion 24b. Each pair of generally aligned portions 24a provides upwardly facing load supporting surfaces which are adapted to carry a load. The loads are preferably carried upon pallets P supported on portions 24a.

The load carrier 16 may comprise a pair of vertical masts 26 connected across the tops thereof by an upper end member 28 and across the bottom by a lower end member 30. The masts 26 are preferably disposed along the center line of the aisle, and are spaced apart in the direction of the aisle. The upper end member is preferably provided with wheels or rollers 31 for rolling engagement with an overhead track or guide 32 carried by transverse frame members 34 coupling storage sections 10 and 12 together. Similarly, base member 30 may be provided with wheels or rollers 36 for rolling guided engagement with a base rail or track 37. One of the wheels 36 is preferably powered driven for driving the load carrier horizontally along the aisle, such as for instance by means of a motor 38 and associated gear reduction means of any suitable type. The masts 26 and the end members 28, 30 constitute a horizontally movable frame which will be hereinafter referred to as conveyor means on which is mounted a vertically movable elevator 40. Any suitable means, including for instance a motor 42, may be provided for moving the elevator vertically with respect to the masts 26 thereby providing for storing loads at different elevations in the storage frame.

The elevator 40 may have a laterally movable extractor 44 which may comprise an outer upper frame and an inner lower frame which preferably provides an extensible table, with such table being extendible in either of the opposed sections transverse to the direction of movement of the load carrier in the travel zone, so as to locate the extractor within either of the storage sections effective to place the extensible table in position to deposit or remove a load from a selected one of the storage bins. Suitable power means, such as motor 48 may be mounted on the elevator 40 and operatively coupled to the extractor, for actuating the latter. Reference may be had to the aforementioned U.S. patent application, Ser. No. 484,845 for a more detailed disclosure of a suitable extensible extractor mechanism.

It will be understood that during movement of the load carrier in the travel zone and along its guiding track means 32, 37, that considerable vibrations may be set up in the load carrier and also in the storage frame sections during movement of the load carrier therealong. During any such vibration of the storage frame, loads which are supported on the load rails 24 can be vibrated sufficiently to cause them to move along the load rail supporting portions 24a and toward the travel zone. If such loads project outwardly into the travel zone, they will interfere with the movement of the load carrier in the travel zone, and will cause damage to the load carrier, or to the loads, or to the storage frame sections.

Figure 3:
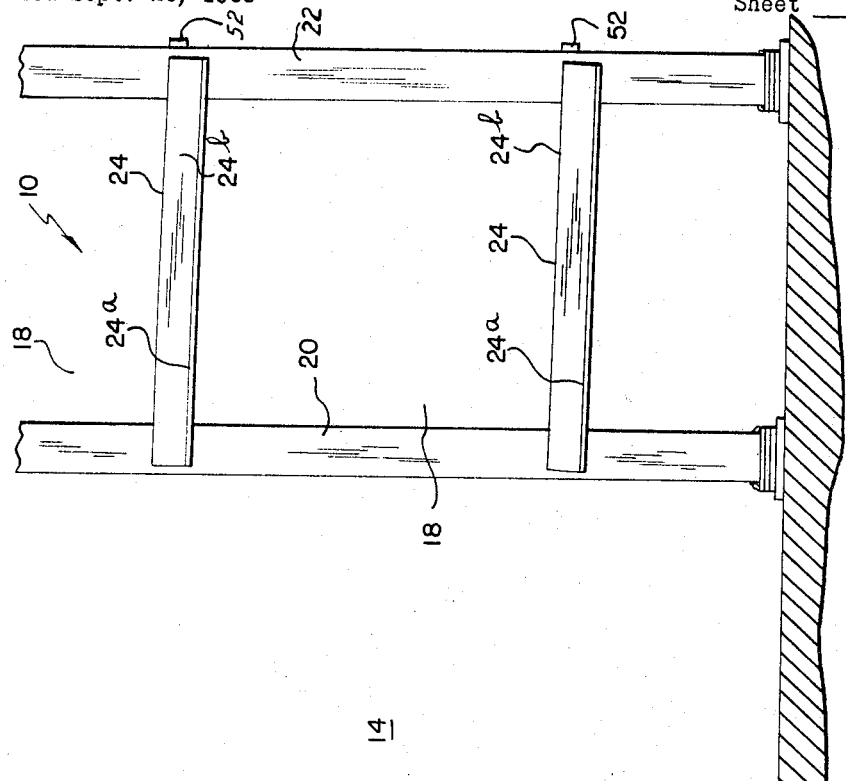
FIGURE 3 is an enlarged fragmentary end elevational view of a portion of a storage frame embodying the instant invention.
Figure 3:
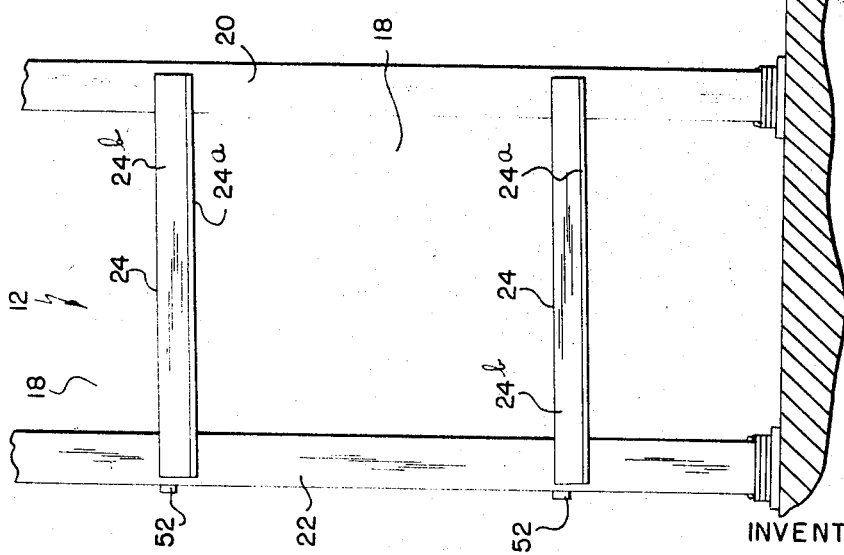

Now in accordance with the instant invention, in order to prohibit such vibratory movement of a load along the load supporting rails 24 of the storage frame sections, the load supporting members 24, in the embodiment illustrated, are tilted in a downward direction, commencing at the forward or load receiving ends thereof (of in other words at the aisle ends) and terminating adjacent the rearward ends thereof. In the embodiment illustrated and referring in particular to FIGURE 3, this downward slope has been set at a rate of 1/16 inch per foot length of the load supporting rail member 24, which rate of slope has been found adequate at all speeds of the load carrier to restrict outward movement of the loads in the storage frame. Speeds of a load carrier in an automatic warehousing system of the type with which the present invention is concerned may range up to 300 feet per minute. Thus, when a load is bridged across a pair of oppositely spaced load support members 24 and the storage frame vibrates due to for instance the movement of the load carrier 16 along the travel zone in its operation of either depositing or withdrawing a load from the storage frame, the downward slope of the load support members 24 in a direction away from the travel zone, associated with the force due to the weight of gravity of the load, prevents the load from moving outwardly into the travel zone and therefore prevents interference to movement of the load carrier along the aisle. Stops 52 may be provided on the rear of each storage bin adjacent the outer end of the associated rails 24, so as to prevent movement of the load through the bin when the load carrier deposits a load therein.

When depositing an article or load in one of the storage bins, the extractor 44 on the elevator 40 is located opposite the bin opening such that as the load is moved into the storage bin, the upper section of the extractor is slightly above the load supporting portions 24a of the angle members 24. When the load is completely within the confines of the bin, the elevator 40 may be lowered so as to deposit the load pallet P onto the supporting portions 24a so as to permit retraction of the upper and lower table sections of the extractor back to their stacked position centrally of the elevator. It will be seen that the aforementioned stops at the rear end of each of the bins prevent movement of the load through the respective bin in such an instance.

Conversely, when it is desired to remove a load or article from a bin, the extractor 44 on the elevator is located such that the upper table section of the extractor is extended into the bin slightly below the load supporting pallet. Thereafter the elevator may be raised so as to lift the load pallet and associated load off its supporting angle portions 24a, and the extractor is retracted to its stacked condition, preparatory to moving the load carrier either back to the pickup and discharge station or to its next position in the storage frame.

The movement of the conveyor frame 26, 28 and 30 of the load carrier and the movement of the elevator and extractor thereof, are all preferably automatically acuated extractor thereof, are all preferably automatically actuated movements, to store or retrieve a load, and as by means of an automatic control system of the type disclosed in the copending United States patent application of Sanford Saul, filed Dec. 14, 1964 under Ser. No. 418,048 and entitled Electrical Control Circuit for an Automatic Warehousing System.

Figure 4:
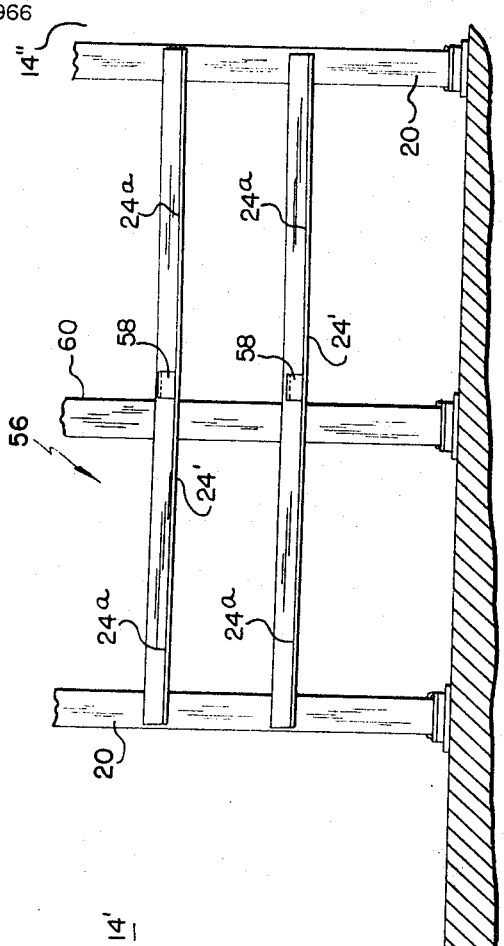
FIGURE 4 is a fragmentary end elevational view of a modified form of storage frame embodying the instant invention.

Referring now to FIGURE 4, the storage frame illustrated therein is what is known as a double ladder type frame 56, or, in other words, there is provided a pair of the storage frame sections with their open load receiving ends facing respective travel zones 14', 14" and with their rear ends disposed in juxtapositioned relationship, with stop members 58 being provided to stop the load in each of the bins from moving into the adjacent bin. The load carrying rails 24' are sloped downwardly in a similar manner as the first described embodiment, with the lowest point of the slope being disposed substantially at the location of the associated rear stop member 58. Accordingly, the load supporting members 24' in side elevation have a somewhat V-shaped appearance to provide this slope commencing at the center portion of the load supporting member and extending outwardly toward the respective travel zone.

In the embodiment illustrated, the center supporting post 60 is disposed laterally of the associated rear stops 58 so that the stops can conveniently extend into the bin openings and thereby prevent movement of a load rearwardly into the next adjacent bin. In certain installations wherein only light loads are to be stored in the system, such center post 60 might be eliminated entirely.

From the foregoing discussion and accompanying drawings it will be seen that the invention provides a novel warehousing system which includes a storage frame for storing loads, and which system has a travel zone alongside the storage frame with a powered load carrier movable in the travel zone for depositing loads into or removing loads from the storage frame, and wherein means is provided in the storage frame for preventing inadvertent movement of loads in the storage frame out of the storage frame into the travel zone in the event of vibratory forces being set up in the storage frame.

I claim:
1. In a warehousing system comprising generally parallel extending laterally spaced storage sections defining a travel zone between said storage sections, each of said storage sections comprising a framework defining a plurality of vertically and horizontally arranged storage bins having open load-receiving ends facing said travel zone, a load carrier movable in said travel zone for depositing loads into and removing loads from said storage sections, said framework comprising generally parallel longitudinal rows of spaced substantially vertical posts including a row of longitudinally spaced aisle posts disposed along said travel zone and a row of longitudinally spaced outer posts spaced laterally outwardly respectively from said aisle posts, each of said outer posts being generally aligned with a respective aisle post, and elongated vertically spaced load support rails extending between each aligned pair of aisle and outer posts and being secured adjacent the ends thereof to the respective pair of aisle and outer posts, said rails extending lengthwise generally transverse to the longitudinal direction of extension of said travel zone, pairs of said load support rails in a longitudinal direction being disposed at the same general level in confronting relation to define the bottom extremity of a respective storage bin and being adapted for supporting a load thereacross in bridging relation, load carrier guide means mounted to said storage sections and extending generally longitudinally parallel to the longitudinal direction of extension of said travel zone, said load carrier coacting with said guide means and being guided in its movement in said travel zone by said guide means, said load carrier comprising a generally longitudinally movable conveyor portion adapted for movement lengthwise of said travel zone, and elevator portion movable vertically on said conveyor portion and an extensible extractor portion mounted on said elevator portion and movable in directions generally transverse of the travel zone into and out of a selected bin for depositing a load thereinto or removing a load therefrom, power means for actuating said conveyor, elevator and extractor portions for effecting a series of movements whereby said conveyor portion is moved to the longitudinal position of a selected bin and said elevator portion is moved to the general level of a selected bin and said extractor portion is reciprocated laterally in a transfer movement to transfer a load between said extractor portion and said selected bin, said extractor portion being movable into and out of said bins at different levels and to a position slightly lower or slightly higher than a selected bin level to pick up or deposit a load respectively, said extractor portion being movable generally vertically in non-interfering relation intermediate said paired support rails of a selected bin and from a position above said paired support rails of a selected bin for depositing a load thereon or from a position below said paired load support rails of the selected bin for picking up a load therefrom, and wherein one of said storage sections has bins disposed in juxtaposed end-to-end relation in a direction transverse of said travel zone, the load receiving ends of said end-to-end bins being the ends thereof opposite to said juxtaposed ends thereof, each of said load receiving ends facing a travel zone with said posts being disposed along the respective travel zone, said load supporting rails for the respective paired end-to-end bins comprising longitudinally spaced elongated members extending from adjacent the load receiving end of one of said paired end-to-end bins to adjacent the load receiving end of the other bin of said paired end-to-end bins and having upwardly facing load supporting surfaces on which are adapted to be supported loads in bridging relation, each of said members presenting a generally V-shaped configuration in side elevation whereby said load supporting surfaces slope downwardly in a direction toward said juxtaposed ends for resisting inadvertent movement of loads supported on said load supporting surfaces in a direction away from said juxtaposed ends.

2. A system in accordance with claim 1 including stop means at the juxtaposed ends of said end-to-end bins for preventing movement of loads therebetween.

3. A system in accordance with claim 1 wherein said one storage section comprises a plurality of series of three vertically extending posts, with the posts of each series being disposed in laterally spaced aligned relation in a direction transverse of said travel zone, the end posts of each of said series of three being aisle posts, each of said series of three mounting a plurality of said V-shaped members thereon in vertically spaced relation therealong, the intermediate post of each of said series of three being disposed closer to one of the other two posts in the respective series of three, and stop means on said members disposed adjacent said intermediate post in centrally disposed relation between said other two posts for preventing movement of loads between the respective of said end-to-end bins.

4. A system in accordance with claim 1 wherein said load carrier is adapted for movement in said travel zone at speeds of up to 300 feet per minute, said load support surfaces are tipped downwardly with respect to the horizontal at a rate of approximately 1/16 inch per foot of length of a respective load support rail, to provide said downward slope of said load support surfaces thereof.

References Cited

UNITED STATES PATENTS

| 1,697,345 | 1/1929 | Chaudoir | 214—16.1 |
| 2,223,962 | 12/1940 | Mitchell | 214—16.1 |
| 2,309,730 | 2/1943 | Hastings. | |
| 2,652,938 | 9/1953 | Murphy | 214—16.1 |
| 2,769,559 | 11/1956 | Johnson | 214—16.4 |
| 2,968,909 | 1/1961 | Jurechko | 214—16.4 |
| 3,283,924 | 11/1966 | Chasar | 214—16.4 |

FOREIGN PATENTS

| 47,102 | 7/1966 | Germany. |
| 1,044,712 | 11/1958 | Germany. |

GERALD M. FORLENZA, Primary Examiner.

R. B. JOHNSON, Assistant Examiner.

U.S. Cl. X.R.

198—214